United States Patent
Cao et al.

(10) Patent No.: US 12,522,526 B2
(45) Date of Patent: Jan. 13, 2026

(54) METHOD FOR REMOVING ORGANIC POLLUTANTS FROM WATER BODIES BY ACTIVATING PERSULFATE WITH NUTRIENT-ENHANCED SOYBEAN SPROUT-BASED BIOCHAR

(71) Applicant: Nanchang Hangkong University, Nanchang (CN)

(72) Inventors: Jiaxin Cao, Jiujiang (CN); Suhua Chen, Nanchang (CN); Shanshan Dong, Shangrao (CN); Helin Hua, Nanchang (CN); Qiugen Zhang, Nanchang (CN); Xianhua Qiu, Nanchang (CN)

(73) Assignee: Nanchang Hangkong University, Nanchang (CN)

( * ) Notice: Subject to any disclaimer, the term of this patent is extended or adjusted under 35 U.S.C. 154(b) by 497 days.

(21) Appl. No.: 17/985,306

(22) Filed: Nov. 11, 2022

(65) Prior Publication Data
US 2023/0150850 A1   May 18, 2023

(30) Foreign Application Priority Data
Nov. 12, 2021   (CN) .......................... 202111339144.6

(51) Int. Cl.
  *C02F 1/72*   (2023.01)
  *A01G 22/40*   (2018.01)
  (Continued)

(52) U.S. Cl.
  CPC .............. *C02F 1/725* (2013.01); *A01G 22/40* (2018.02); *A61L 2/0088* (2013.01); *B01J 21/18* (2013.01);
  (Continued)

(58) Field of Classification Search
  CPC .......... C02F 1/725; C02F 1/283; C02F 1/722; A01G 22/40; A61L 2/0088; B01J 21/18; B01J 37/084; C01B 15/08; C05D 9/02
  See application file for complete search history.

(56) References Cited

U.S. PATENT DOCUMENTS 5,372,425 A * 12/1994 Tannenbaum .......... B01F 31/22
                                                                366/208
9,561,530 B1 * 2/2017 Kinsman ................... B09C 1/10
                                (Continued)

FOREIGN PATENT DOCUMENTS

| CN | 105923843 A | 9/2016 |
| CN | 109292883 | 2/2019 |
| CN | 112852467 A | 5/2021 |

*Primary Examiner* — Jennifer Dieterle
(74) *Attorney, Agent, or Firm* — Nitin Kaushik (57) ABSTRACT

A method for removing organic pollutants from water bodies by activating persulfate with nutrient-enhanced soybean sprout-based biochar involves a method for removing organic pollutants from water bodies by activating persulfate with biochar. The invention is intended to solve the technical problems that existing biochar materials show poor catalytic activity when used for activating persulfate and requires the addition of a large amount of modifiers, which easily leads to secondary pollution to the environment, and the existing biochar materials are susceptible to interference from halogen ions, oxoanions, and natural organic matters in a persulfate system. The raw material of a catalyst used in the invention is soybean, and has an activation process mainly based on non-radical activation, exhibiting high reaction rate and saving persulfate. With the addition of 0.2 g/L catalyst and 0.5 mM potassium persulfate, the degradation efficiency against 10 mg/L phenol can reach 100% within 10 min.

6 Claims, 7 Drawing Sheets

(51) Int. Cl.
*A61L 2/00* (2006.01)
*B01J 21/18* (2006.01)
*B01J 37/08* (2006.01)
*C01B 15/08* (2006.01)
*C05D 9/02* (2006.01)
*A61L 101/06* (2006.01)
*C02F 101/34* (2006.01)

(52) U.S. Cl.
CPC ............. *B01J 37/084* (2013.01); *C01B 15/08* (2013.01); *C05D 9/02* (2013.01); *A61L 2101/06* (2020.08); *C02F 2101/345* (2013.01)

(56) References Cited

U.S. PATENT DOCUMENTS

| | | | | |
|---|---|---|---|---|
| 2013/0319933 | A1* | 12/2013 | Williams | C02F 3/00 |
| | | | | 210/601 |
| 2015/0144564 | A1* | 5/2015 | Moller | C02F 1/283 |
| | | | | 210/201 |
| 2018/0105437 | A1* | 4/2018 | Beierwaltes | B01D 29/114 |
| 2019/0071334 | A1* | 3/2019 | Labrecque | C02F 3/06 |
| 2019/0254244 | A1* | 8/2019 | Brion | A01G 31/02 |

* cited by examiner

METHOD FOR REMOVING ORGANIC POLLUTANTS FROM WATER BODIES BY ACTIVATING PERSULFATE WITH NUTRIENT-ENHANCED SOYBEAN SPROUT-BASED BIOCHAR

CROSS-REFERENCE TO RELATED APPLICATIONS

The application claims priority to Chinese patent application No. 202111339144.6, filed on Nov. 12, 2021, the entire contents of which are incorporated herein by reference.

TECHNICAL FIELD

The invention relates to a method for removing organic pollutants from water bodies by activating persulfate with biochar.

BACKGROUND

In recent years, with the rapid development of industrial technology and medical technology, an increasing number of organic pollutants are discharged to natural water bodies, which seriously affects the quality of water bodies and the balance of a water eco-environment.

Due to their strong hydrophobicity and undegradability in the natural environment, the organic pollutants are easy to remain and accumulate in the environment and organisms, and will be enriched and enlarged via food chains, which seriously affects the health and life of humans and causes irreparable damage to the environment.

At present, common treatment methods include adsorption, the Fenton method, the membrane separation method, the biodegradation method, etc. However, these methods have defects such as complicated technological operation, high equipment requirements, low efficiency, and incomplete treatment.

With respect to high-toxicity and undegradable organic containments, the expected effect cannot be achieved with traditional methods. A persulfate-based advanced oxidation technology involves sulfate radicals with longer lifetime and stronger oxidizing capacity, requires loose reaction conditions, and applies to a variety of water environments.

However, during the application of persulfate activation technology at a current stage, there are also problems such as additional energy activation, greatly reduced economy, and secondary pollution caused by metal ion released from a metal-based activating agent. Carbon-based materials have characteristics such as high specific surface area, excellent electron transport capacity, surface-regulatory functionalized functional groups, and sp2 hybridized carbon structure that can effectively participate in redox reactions, and have good environmental compatibility, showing a great potential in activating persulfate to treat the organic pollutants in water bodies.

Metal-free carbon materials such as carbon nanotubes and graphene oxide can effectively activate persulfate, but these catalysts have a preparation process that is complicated and costly, which makes it difficult for them to be actually used in industrial water treatment. In addition, biochar materials can also be used to activate persulfate. However, original biochar materials exhibit poor catalytic activity, and often need to be modified by a large amount of modifiers, which easily leads to secondary pollution to the environment, and these materials are susceptible to interference from halogen ions, oxoanions, and natural organic matters in a persulfate system.

Therefore, it is strongly necessary to explore a novel biochar material with simple preparation process, economy, high efficiency, high catalytic activity, and strong interference resistance.

Soybean sprouts are plants with short growth cycle, widely available sources, and economy. Sprouting involves a simple and low-cost bioprocessing technology.

SUMMARY

The invention provides a method for removing organic pollutants from water bodies by activating persulfate with nutrient-enhanced soybean sprout-based biochar, in order to solve the technical problems that existing biochar materials show poor catalytic activity when used for activating the persulfate and requires the addition of a large amount of modifiers, which easily leads to secondary pollution to the environment, and the existing biochar materials are susceptible to interference from halogen ions, oxoanions, and natural organic matters in a persulfate system.

The method for removing organic pollutants from water bodies by activating persulfate with nutrient-enhanced soybean sprout-based biochar according to the invention comprises the following steps:

I, immersing soybeans in an aqueous sodium hypochlorite solution with a mass fraction of 0.1% to 0.15% for 15 min to 20 min for disinfection, removing the soybeans and washing the soybeans with deionized water, then immersing the soybeans in a nutrient solution for 10 h to 11 h, removing the soybeans and placing the soybeans on a sprouting tray, placing the sprouting tray in a constant-temperature incubator for sprouting for 5 days to 6 days, and during the sprouting, spraying the nutrient solution periodically to keep the surface of the soybeans moistened, such that soybean sprouts are obtained,
  wherein a method for preparing the nutrient solution includes: dissolving ferrous sulfate heptahydrate, zinc sulfate heptahydrate and potassium iodide in water, and mixing evenly to obtain the nutrient solution, in which $Fe^{2+}$ has a concentration of 30 mg/L to 35 mg/L, $Zn^{2+}$ has a concentration of 30 mg/L to 35 mg/L, and $I^+$ has a concentration of 15 mg/L to 20 mg/L, and
  the sprouting occurs under the following conditions: a temperature of 25° C. to 26° C. and a humidity of 75% to 80%;

II, drying the soybean sprouts prepared in step I at a temperature of 60° C. to 65° C. for 1.5 h to 2 h, and then carrying out pyrolytic charring,
  wherein the pyrolytic charring is carried out under the following conditions: heating to 900° C. to 950° C. from room temperature at a heating rate of 5° C./min to 12° C./min, with a pyrolytic charring time of 1 h to 2 h, and then cooling to room temperature with the furnace, with a nitrogen atmosphere present throughout a whole process;

III, immersing a product of the pyrolytic charring in step II in a 0.5 mol/L to 0.6 mol/L aqueous $H_2SO_4$ solution for 12 h to obtain nutrient-enhanced soybean sprout-based biochar,
  wherein a mass ratio of the product of the pyrolytic charring in step II to the 0.5 mol/L to 0.6 mol/L aqueous $H_2SO_4$ solution is 1:(10-11); and IV, placing a vessel containing wastewater to be treated on a shaker, adding the nutrient-enhanced soybean sprout-based biochar prepared in step III and persulfate to the wastewater, and allowing to react for 0.5 h to 1 h at a revolving speed of 200 rpm to 500 rpm to oxidize and degrade the organic pollutants in the water body, wherein reaction conditions are controlled as follows: under atmospheric pressure and at a reaction temperature of 15° C. to 45° C., the wastewater has an initial pH of 3 to 11, the nutrient-enhanced soybean sprout-based biochar prepared in step III in a reaction system has an addition amount of 0.1 g/L to 0.4 g/L, and the persulfate in the reaction system has a concentration of 0.5 mmol/L to 4 mmol/L.

The principle of the invention consists in that: the invention first provides a high-activity non-metal catalyst (namely, the nutrient-enhanced soybean sprout-based biochar) for activating persulfate to oxidize organic pollutants; the catalyst is the nutrient-enhanced soybean sprout-based biochar that is prepared by sprouting soybeans as raw material with a nutrient solution and charring the sprouts; and the nutrient-enhanced soybean sprout-based biochar is capable of degrading the organic pollutants in the persulfate oxidization reaction system.

The invention increases the graphitization degree of the char material by means of high-temperature treatment, and greatly improves the electron transport capacity of the char material, whereby the persulfate can be activated to produce active radicals to achieve oxidative degradation of the organic pollutants. Also, non-radical pathways can be constructed, whereby electron-enriched organic matters lose electrons by means of electron conduction to achieve oxidative degradation.

In contrast to the traditional methods, the non-radical pathways in the method of the invention do not depend on active oxidizing species, showing stronger interference resistance and low susceptibility to solution pH and coexisting substances. The method can better adapt to a variety of actually complex water bodies and has a powerful practical application prospect.

After the germination of soybean seeds, the insoluble macromolecular substances stored in the seeds per se will be converted into soluble simple substances under the catalytic action of various endogenous proteases, and the content of active factors such as vitamin C, γ-aminobutyric acid, and isoflavone therein will be increased. During the germination process of soybeans, trace elements can also be absorbed to inside of sprouts under the actions of transfer proteins and various proteases. Such a method of absorbing the trace elements via the biological growth process is more economic and environmental-friendly compared with physical or chemical doping.

The raw material of a catalyst used in the invention is soybean, which is featured with abundant source, low cost, simple preparation process and environmental-friendliness, and has an activation process mainly based on non-radical activation, exhibiting high reaction rate and saving persulfate. With the addition of 0.2 g/L catalyst and 0.5 mM potassium persulfate, the degradation efficiency against 10 mg/L phenol can reach 100% within 10 min.

DETAILED DESCRIPTION OF THE EMBODIMENTS

Embodiment I: This embodiment related to a method for removing organic pollutants from water bodies by activating persulfate with nutrient-enhanced soybean sprout-based biochar. The method was carried out in the following steps.

I. Soybeans were immersed in an aqueous sodium hypochlorite solution with a mass fraction of 0.1% to 0.15% for 15 min to 20 min for disinfection, then taken out to be washed with deionized water, and then immersed in a nutrient solution for 10 h to 11 h. The soybeans were removed and placed on a sprouting tray. The sprouting tray was placed in a constant-temperature incubator for sprouting for 5 days to 6 days. During the sprouting, the nutrient solution was sprayed periodically to keep the surface of the soybeans moistened, such that soybean sprouts were obtained.

A method for preparing the nutrient solution included: dissolving ferrous sulfate heptahydrate, zinc sulfate heptahydrate and potassium iodide in water, and mixing evenly to obtain the nutrient solution, in which $Fe^{2+}$ had a concentration of 30 mg/L to 35 mg/L, $Zn^{2+}$ had a concentration of 30 mg/L to 35 mg/L, and $I^+$ had a concentration of 15 mg/L to 20 mg/L.

The sprouting occurred under the following conditions: a temperature of 25° C. to 26° C. and a humidity of 75% to 80%.

II. The soybean sprouts prepared in step I were dried at a temperature of 60° C. to 65° C. for 1.5 h to 2 h, and then subjected to pyrolytic charring.

The pyrolytic charring was carried out under the following conditions: heating to 900° C. to 950° C. from room temperature at a heating rate of 5° C./min to 12° C./min, with a pyrolytic charring time of 1 h to 2 h, and then cooling to room temperature with the furnace, with a nitrogen atmosphere present throughout the whole process.

III. A product of the pyrolytic charring in step II was immersed in a 0.5 mol/L to 0.6 mol/L aqueous $H_2SO_4$ solution for 12 h to obtain nutrient-enhanced soybean sprout-based biochar.

A mass ratio of the product of the pyrolytic charring in step II to the 0.5 mol/L to 0.6 mol/L aqueous $H_2SO_4$ solution was 1:(10-11).

IV. A vessel containing wastewater to be treated was placed on a shaker, the nutrient-enhanced soybean sprout-based biochar prepared in step III and persulfate were added to the wastewater, and reaction was allowed to occur for 0.5 h to 1 h at a revolving speed of 200 rpm to 500 rpm to oxidize and degrade the organic pollutants in the water body. Reaction conditions were controlled as follows: under atmospheric pressure and at a reaction temperature of 15° C. to 45° C., the wastewater had an initial pH of 3 to 11, the nutrient-enhanced soybean sprout-based biochar prepared in step III in a reaction system had an addition amount of 0.1 g/L to 0.4 g/L, and the persulfate in the reaction system had a concentration of 0.5 mmol/L to 4 mmol/L.

Embodiment II: This embodiment differs from Embodiment I in that, in step I, the soybeans were immersed in the aqueous sodium hypochlorite solution with a mass fraction of 0.1% for 15 min for disinfection, then taken out to be washed with clean water, and then immersed in the nutrient solution for 10 h. This embodiment is the same as Embodiment I in other aspects.

Embodiment III: This embodiment differs from Embodiment I or II in that, in the nutrient solution in step I, $Fe^{2+}$ had a concentration of 30 mg/L, $Zn^{2+}$ had a concentration of 30 mg/L, and $I^+$ had a concentration of 15 mg/L. This embodiment is the same as Embodiment I or II in other aspects.

Embodiment IV: This embodiment differs from Embodiments I to III in that, in step I, the sprouting occurred under the following conditions: a temperature of 25° C. and a humidity of 75%. This embodiment is the same as one of Embodiments I to III in other aspects.

Embodiment V: This embodiment differs from Embodiment IV in that, in step II, the pyrolytic charring was carried out under the following conditions: heating to 900° C. from room temperature at a heating rate of 5° C./min to 12° C./min, with a pyrolytic charring time of 1 h to 2 h, and then cooling to room temperature with the furnace, with a nitrogen atmosphere present throughout a whole process. This embodiment is the same as Embodiment IV in other aspects.

Embodiment VI: This embodiment differs from Embodiment I in that, in step III, a product of the pyrolytic charring in step II was immersed in a 0.5 mol/L aqueous $H_2SO_4$ solution for 12 h to obtain nutrient-enhanced soybean sprout-based biochar. This embodiment is the same as Embodiment I in other aspects.

The invention was verified by means of the following tests.

Test I: This test related to a method for removing organic pollutants from water bodies by activating persulfate with nutrient-enhanced soybean sprout-based biochar. The method was carried out in the following steps.

I. 30 g of soybeans were immersed in an aqueous sodium hypochlorite solution with a mass fraction of 0.1% for 15 min for disinfection, then taken out to be washed with deionized water, and then immersed in a nutrient solution for 10 h. The soybeans were taken out and placed on a sprouting tray. The sprouting tray was placed in a constant-temperature incubator for sprouting for 5 days. During the sprouting, the nutrient solution was sprayed periodically (four times per day) to keep the surface of the soybeans moistened, such that soybean sprouts were obtained.

A method for preparing the nutrient solution includes: dissolving ferrous sulfate heptahydrate, zinc sulfate heptahydrate and potassium iodide in water, and mixing evenly to obtain the nutrient solution, in which $Fe^{2+}$ had a concentration of 30 mg/L, $Zn^{2+}$ had a concentration of 30 mg/L, and $I^+$ had a concentration of 15 mg/L.

The sprouting occurred under the following conditions: a temperature of 25° C. and a humidity of 75%.

II. 5 g of the soybean sprouts prepared in step I were dried at a temperature of 60° C. for 1.5 h, and then subjected to pyrolytic charring.

The pyrolytic charring was carried out under the following conditions: heating to 500° C. from room temperature at a heating rate of 8° C./min, with a pyrolytic charring time of 2 h, and then cooling to room temperature with the furnace, with a nitrogen atmosphere present throughout the whole process at a nitrogen flow rate 1 mL/min.

III. A product of the pyrolytic charring in step II was immersed in a 0.5 mol/L aqueous $H_2SO_4$ solution for 12 h to obtain nutrient-enhanced soybean sprout-based biochar.

A mass ratio of the product of the pyrolytic charring in step II to the 0.5 mol/L to 0.6 mol/L aqueous $H_2SO_4$ solution was 1:10.

IV. A vessel containing wastewater to be treated was placed on a shaker, the nutrient-enhanced soybean sprout-based biochar prepared in step III and potassium hydrogen persulfate were added to the wastewater, and reaction was allowed to occur for 0.5 h at a revolving speed of 400 rpm to oxidize and degrade the organic pollutants in the water body. Reaction conditions were controlled as follows: under atmospheric pressure and at a reaction temperature of 25° C., the wastewater had an initial pH of 7, the nutrient-enhanced soybean sprout-based biochar prepared in step III in a reaction system had an addition amount of 0.2 g/L, and the potassium hydrogen persulfate in the reaction system had a concentration of 0.5 mmol/L.

The wastewater to be treated was 10 mg/L aqueous phenol solution.

Test II: This test differs from Test I in: in step II, heating to 700° C. from room temperature at a heating rate of 8° C./min. This test is the same as Test I in other aspects.

Test III: This test differs from Test I in: in step II, heating to 900° C. from room temperature at a heating rate of 8° C./min. This test is the same Test I in other aspects.

Test IV: This test differs from Test I in: in step II, heating to 1000° C. from room temperature at a heating rate of 8° C./min. This test is the same as Test I in other aspects.

Figure 1:
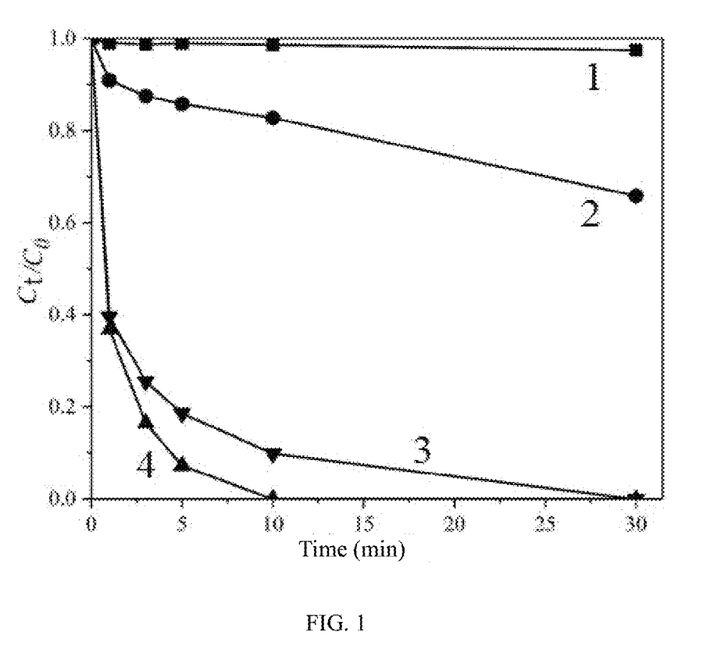
FIG. 1 is a graph showing degradation effects against a first pollutant.

FIG. 1 was a graph showing degradation effects against a first pollutant, with a reaction time in step IV as the X-axis, in which a curve 1 indicated Test I, a curve 2 indicated Test II, a curve 3 indicated Test IV, and a curve 4 indicated Test III. From FIG. 1, it could be seen that Test IV showed a degradation effect of 100% within 30 min; Test III showed a degradation effect of 100% against phenol within 30 min; Test II showed a degradation effect of 39.2% within 30 min; Test I showed a degradation effect of 2.5% against phenol within 30 min; the activated persulfate in Test III showed the best degradation effect against phenol, which reached 100% within 10 min. Accordingly, the optimal temperature for pyrolytic charring was 900° C.

Test V: This test was a comparative test as follows.

I. 30 g of soybeans were immersed in an aqueous sodium hypochlorite solution with a mass fraction of 0.1% for 15 min for disinfection, then removed and immersed in deionized water for 10 h. The soybeans were removed and placed on a sprouting tray. The sprouting tray was placed in a constant-temperature incubator for sprouting for 5 days. During the sprouting, the nutrient solution was sprayed periodically (four times per day) to keep the surface of the soybeans moistened, such that ordinary soybean sprouts were obtained.

A method for preparing the nutrient solution included: dissolving ferrous sulfate heptahydrate, zinc sulfate heptahydrate and potassium iodide in water, and mixing evenly to obtain the nutrient solution, in which $Fe^{2+}$ had a concentration of 30 mg/L, $Zn^{2+}$ had a concentration of 30 mg/L, and $I^+$ had a concentration of 15 mg/L.

The sprouting occurred under the following conditions: a temperature of 25° C. and a humidity of 75%.

II. 5 g of the soybean sprouts prepared in step I were dried at a temperature of 60° C. for 1.5 h, and then subjected to pyrolytic charring.

The pyrolytic charring was carried out under the following conditions: heating to 900° C. from room temperature at a heating rate of 8° C./min, with a pyrolytic charring time of 2 h, and then cooling to room temperature with the furnace, with a nitrogen atmosphere present throughout the whole process at a nitrogen flow rate of 1 mL/min.

III. A product of the pyrolytic charring in step II was immersed in a 0.5 mol/L aqueous $H_2SO_4$ solution for 12 h to obtain ordinary soybean sprout-based biochar.

A mass ratio of the product of the pyrolytic charring in step II to the 0.5 mol/L to 0.6 mol/L aqueous $H_2SO_4$ solution was 1:10.

IV. A vessel containing wastewater to be treated was placed on a shaker, the ordinary soybean sprout-based biochar prepared in step III and potassium hydrogen persulfate were added to the wastewater, and reaction was allowed to occur for 0.5 h at a revolving speed of 400 rpm to oxidize and degrade the organic pollutants in the water body. Reaction conditions were controlled as follows: under atmospheric pressure and at a reaction temperature of 25° C., the wastewater had an initial pH of 7, the ordinary soybean sprout-based biochar prepared in step III in a reaction system had an addition amount of 0.2 g/L, and the potassium hydrogen persulfate in the reaction system had a concentration of 0.5 mmol/L.

The wastewater to be treated was 10 mg/L aqueous phenol solution.

Figure 2:
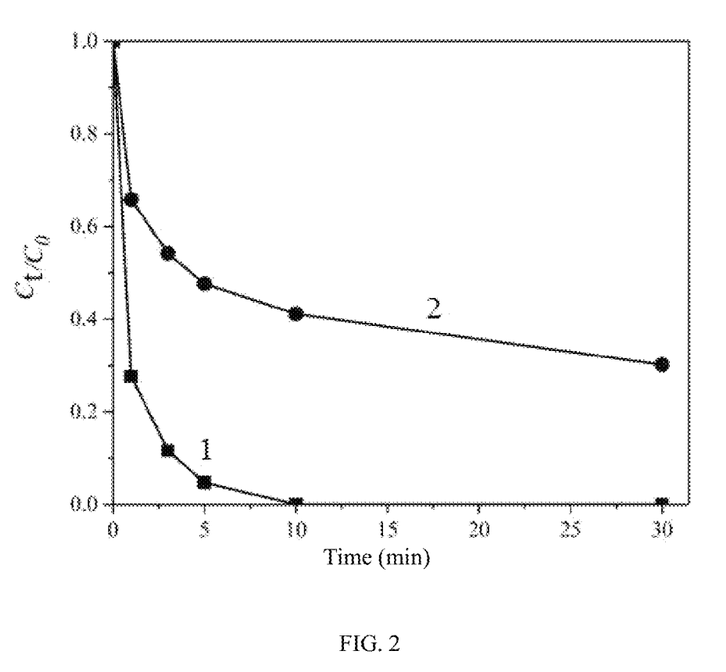
FIG. 2 is a graph showing degradation effects against a second pollutant.

FIG. 2 was a graph showing degradation effects against a second pollutant, with a reaction time in step IV as the X-axis, in which a curve 1 indicated Test III, and a curve 2 indicated Test V. From FIG. 2, it could be seen that Test III showed a degradation effect of 100% within 30 min, and Test V showed a degradation effect of 69.8% against phenol within 30 min. It indicated that, compared with ordinary soybean sprout-based biochar (Test V), the nutrient-enhanced soybean sprout-based biochar had higher catalytic activity, and was capable of activating persulfate at high efficiency to degrade the organic pollutants.

Test VI: This test differs from Test III in that, in the reaction system in step IV, the potassium hydrogen persulfate had a concentration of 1 mmol/L, and the wastewater to be treated was 20 mg/L aqueous phenol solution. This test is the same Test III in other aspects.

Test VII: This test differs from Test III in that, in the reaction system in step IV, the potassium hydrogen persulfate had a concentration of 1 mmol/L, and the wastewater to be treated was 20 mg/L aqueous carbamazepine solution. This test is the same as Test III in other aspects.

Test VIII: This test differs from Test III in that, in the reaction system in step IV, the potassium hydrogen persulfate had a concentration of 1 mmol/L, and the wastewater to be treated was 20 mg/L aqueous sulfamethoxazole solution. This test is the same as Test III in other aspects.

Test IX: This test differs from Test III in that, in the reaction system in step IV, the potassium hydrogen persulfate had a concentration of 1 mmol/L, and the wastewater to be treated was 20 mg/L aqueous bisphenol A solution. This test is the same as Test III in other aspects.

Figure 3:
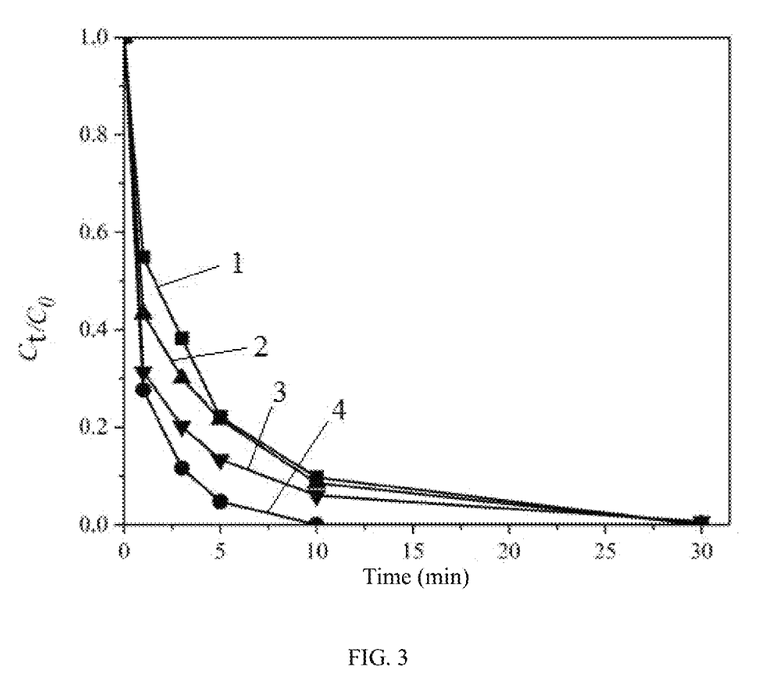
FIG. 3 is a graph showing degradation effects against a third pollutant.

FIG. 3 was a graph showing degradation effects against a third pollutant, with a reaction time in step IV as the X-axis, in which a curve 1 indicated Test VII, a curve 2 indicated Test IX, a curve 3 indicated Test XIII, and a curve 4 indicated Test VI. From FIG. 3, it could be seen that phenol, carbamazepine, sulfamethoxazole, and bisphenol A each could be degraded at an efficiency of 100% within 30 min, indicating that the nutrient-enhanced soybean sprout-based biochar was capable of activating persulfate at high efficiency to degrade most of common organic pollutants.

Test X: This test differs from Test III in that the initial pH of the wastewater was 3, 5, 9 and 11 respectively. This test is the same as Test III in other aspects.

Figure 4:
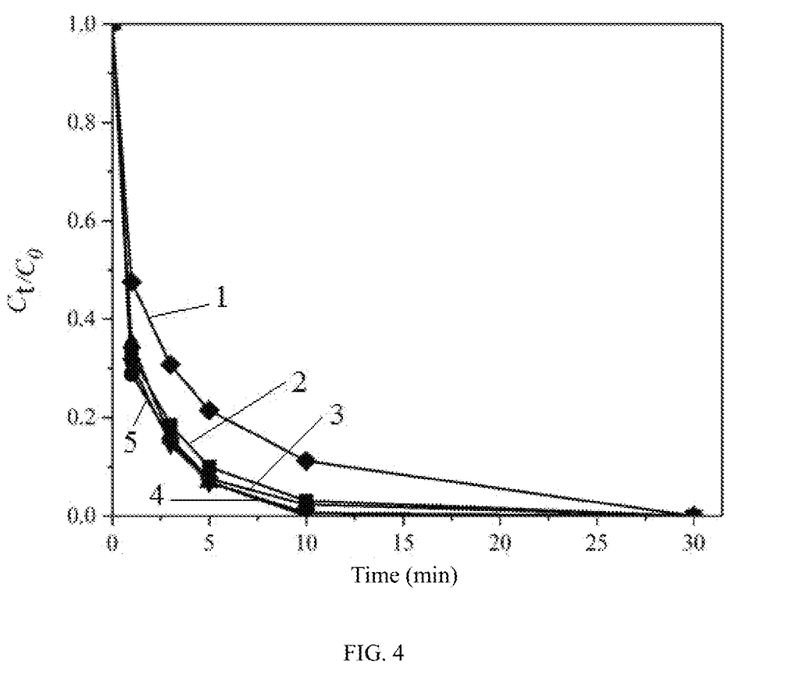
FIG. 4 is a graph showing degradation effects against a fourth pollutant.

FIG. 4 was a graph showing degradation effects against a fourth pollutant, with a reaction time in step IV as the X-axis, in which a curve 1 corresponded to pH of 11, a curve 2 corresponded to pH of 3, a curve 3 corresponded to pH of 5, a curve 4 corresponded to pH of 7, and a curve 5 corresponded to pH of 9. From FIG. 4, it could be seen that, at the pH of 3, 5, 7, 9 and 11, the nutrient-enhanced soybean sprout-based biochar in each case degraded phenol at an efficiency of 100% within 30 min. It indicated that the nutrient-enhanced soybean sprout-based biochar was adapted to a broad range of pH, showing good applicability.

Test XI: This test differs from Test III in that, in step IV, the wastewater to be treated was 10 mg/L aqueous phenol solution, in which 10 mM $Cl^+$, 10 mM $NO_3^+$, 10 mM $H_2PO_4^+$, or 10 mg/L humic acid was blended. This test is the same as Test III in other aspects.

Figure 5:
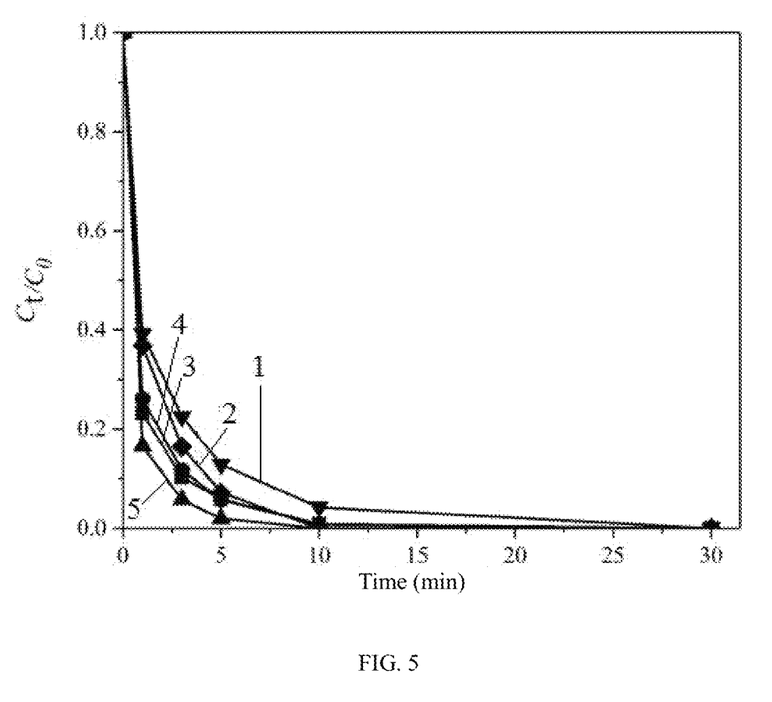
FIG. 5 is a graph showing degradation effects against a fifth pollutant.

FIG. 5 was a graph showing degradation effects against a fifth pollutant, with a reaction time in step IV as the X-axis, in which a curve 1 corresponded to the humic acid, a curve 2 corresponded to Test III, a curve 3 corresponded to $H_2PO_4^+$, a curve 4 corresponded to $Cl^+$, and a curve 5 corresponded to $NO_3^+$. From FIG. 5, it could be seen that, in the case of an aqueous phenol solution containing 10 mM $Cl^+$, 10 mM $NO_3^+$, 10 mM $H_2PO_4^+$, and 10 mg/L humic acid, the nutrient-enhanced soybean sprout-based biochar in each case degraded phenol at an efficiency of 100% within 30 min, indicating that this material had good interference resistance.

Test XII: This test differs from Test III in that the reaction temperature in step IV was 30° C. and 40° C. This test is the same as Test III in other aspects.

Figure 6:
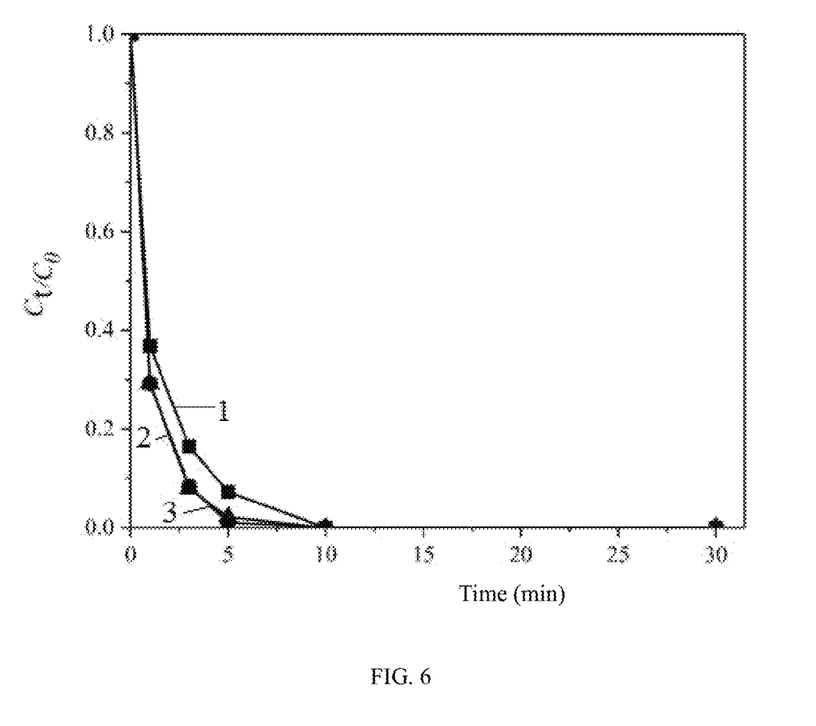
FIG. 6 is a graph showing degradation effects against a sixth pollutant.

FIG. 6 was a graph showing degradation effects against a sixth pollutant, with a reaction time in step IV as the X-axis, in which a curve 1 corresponded to 25° C., a curve 2 corresponded to 30° C., and a curve 3 corresponded to 40° C. From FIG. 6, it could be seen that, in the case of different reaction temperatures, the biochar in each case degraded phenol at 100%.

Figure 7:
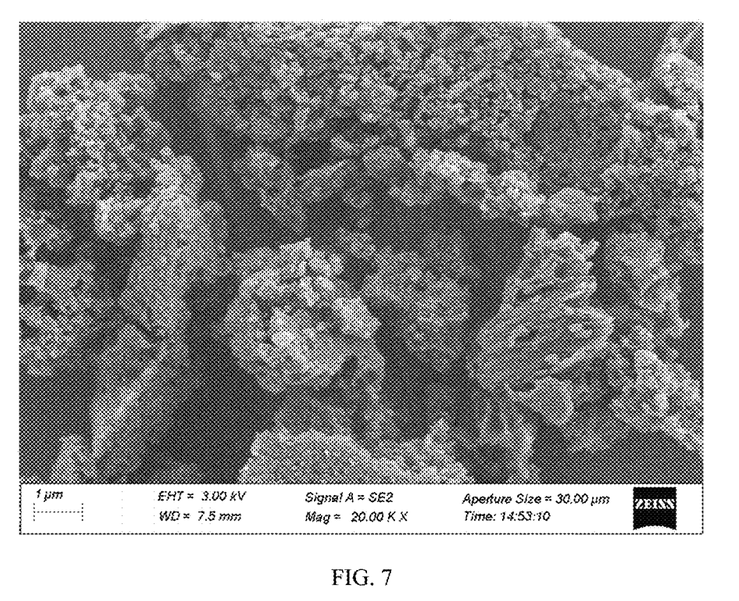
FIG. 7 is an SEM diagram of nutrient-enhanced soybean sprout-based biochar prepared in step III of Test III.

FIG. 7 was an SEM diagram of the nutrient-enhanced soybean sprout-based biochar prepared in step III of Test III. It could be seen that it had large specific surface area and large porosity.

What is claimed is:

1. A method for removing organic pollutants from a natural water body by activating persulfate with nutrient-enhanced soybean sprout-based biochar, comprising the following steps:

I, immersing soybeans in an aqueous sodium hypochlorite solution with a mass fraction of 0.1% to 0.15% for 15 min to 20 min for disinfection, removing the soybeans and washing the soybeans with deionized water, then immersing the soybeans in a nutrient solution for 10 h to 11 h, removing the soybeans and placing the soybeans on a sprouting tray, placing the sprouting tray in a constant-temperature incubator for sprouting for 5 days to 6 days, during which the nutrient solution is periodically sprayed to keep the surface of the soybeans moistened, such that soybean sprouts are obtained, wherein a method for preparing the nutrient solution comprises: dissolving ferrous sulfate heptahydrate, zinc sulfate heptahydrate and potassium iodide in water, and mixing evenly to obtain the nutrient solution, in which $Fe^{2+}$ has a concentration of 30 mg/L to 35 mg/L, $Zn^{2+}$ has a concentration of 30 mg/L to 35 mg/L, and $I^-$ has a concentration of 15 mg/L to 20 mg/L, and the sprouting occurs under the following conditions: a temperature of 25° C. to 26° C. and a humidity of 75% to 80%;

II, drying the soybean sprouts prepared in step I at a temperature of 60° C. to 65° C. for 1.5 h to 2 h, and then carrying out pyrolytic charring, wherein the pyrolytic charring is carried out under the following conditions: heating to 900° C. to 950° C. from room temperature at a heating rate of 5° C./min to 12° C./min, with a pyrolytic charring time of 1 h to 2 h, and then cooling to room temperature with the furnace, with a nitrogen atmosphere present throughout a whole process;

III, immersing a product of the pyrolytic charring in step II in a 0.5 mol/L to 0.6 mol/L aqueous $H_2SO_4$ solution for 12 h to obtain nutrient-enhanced soybean sprout-based biochar, wherein a mass ratio of the product of the pyrolytic charring in step II to the 0.5 mol/L to 0.6 mol/L aqueous $H_2SO_4$ solution is 1: (10-11); and IV, placing a vessel containing wastewater derived from a natural water body and to be treated on a laboratory shaker, adding the nutrient-enhanced soybean sprout-based biochar prepared in step III and persulfate to the wastewater in the vessel, and allowing to react for 0.5 h to 1 h at a revolving speed of 200 rpm to 500 rpm to oxidize and degrade the organic pollutants in the wastewater from the natural water body within the vessel, wherein reaction conditions are controlled as follows: under atmospheric pressure and at a reaction temperature of 15° C. to 45° C., the wastewater has an initial pH of 3 to 11, the nutrient-enhanced soybean sprout-based biochar prepared in step III in a reaction system has an addition amount of 0.1 g/L to 0.4 g/L, and the persulfate in the reaction system has a concentration of 0.5 mmol/L to 4 mmol/L.

2. The method for removing organic pollutants from water bodies by activating persulfate with nutrient-enhanced soybean sprout-based biochar according to claim 1, wherein in step I, the soybeans are immersed in the aqueous sodium hypochlorite solution with a mass fraction of 0.1% for 15 min for disinfection, then taken out to be washed with clean water, and then immersed in the nutrient solution for 10 h.

3. The method for removing organic pollutants from water bodies by activating persulfate with nutrient-enhanced soybean sprout-based biochar according to claim 1, wherein in the nutrient solution in step I, $Fe^{2+}$ has a concentration of 30 mg/L, $Zn^{2+}$ has a concentration of 30 mg/L, and $I^-$ has a concentration of 15 mg/L.

4. The method for removing organic pollutants from water bodies by activating persulfate with nutrient-enhanced soybean sprout-based biochar according to claim 1, wherein in step I, the sprouting occurs under the following conditions: a temperature of 25° C. and a humidity of 75%.

5. The method for removing organic pollutants from water bodies by activating persulfate with nutrient-enhanced soybean sprout-based biochar according to claim 1, wherein in step II, the pyrolytic charring is carried out under the following conditions: heating to 900° C. from room temperature at a heating rate of 5° C./min to 12° C./min, with a pyrolytic charring time of 1 h to 2 h, and then cooling to room temperature with the furnace, with a nitrogen atmosphere present throughout the whole process.

6. The method for removing organic pollutants from water bodies by activating persulfate with nutrient-enhanced soybean sprout-based biochar according to claim 1, wherein in step III, the product of the pyrolytic charring in step II is immersed in a 0.5 mol/L aqueous $H_2SO_4$ solution for 12 h to obtain the nutrient-enhanced soybean sprout-based biochar.

* * * * *